(12) United States Patent
Chappel (10) Patent No.: US 7,782,467 B2
(45) Date of Patent: Aug. 24, 2010

(54) METHOD FOR MEASURING VOLUME BY AN OPTICAL SURFACE PROFILOMETER IN A MICROMECHANICAL DEVICE AND A SYSTEM FOR CARRYING OUT SAID MEASUREMENT

(75) Inventor: Eric Chappel, Saint Julien en Genevois (FR)

(73) Assignee: Debiotech S.A., Lausanne (CH)

( * ) Notice: Subject to any disclaimer, the term of this patent is extended or adjusted under 35 U.S.C. 154(b) by 110 days.

(21) Appl. No.: 11/814,661

(22) PCT Filed: Jan. 24, 2006

(86) PCT No.: PCT/FR2006/050045
§ 371 (c)(1),
(2), (4) Date: Apr. 9, 2008

(87) PCT Pub. No.: WO2006/079739
PCT Pub. Date: Aug. 3, 2006

(65) Prior Publication Data
US 2009/0097037 A1    Apr. 16, 2009

(30) Foreign Application Priority Data
Jan. 25, 2005   (FR) .................................. 05 00748

(51) Int. Cl.
*G01B 11/02* (2006.01)
(52) U.S. Cl. .................. 356/511; 356/627; 356/497
(58) Field of Classification Search ............... 356/497, 356/498, 511, 516, 614, 627, 601
See application file for complete search history.

(56) References Cited
U.S. PATENT DOCUMENTS
4,373,815 A * 2/1983 Bruce .......................... 356/498

(Continued)

FOREIGN PATENT DOCUMENTS
WO    0190577    11/2001

(Continued)

OTHER PUBLICATIONS

Klein et al., Transient measurement of surface deflection for beams and membranes in micromechanical devices, SPIE, vol. 3411 0277-786X, pp. 618-622, (1998).

(Continued)

*Primary Examiner*—Tarifur Chowdhury
*Assistant Examiner*—Jonathon D Cook
(74) *Attorney, Agent, or Firm*—The Webb Law Firm (57) ABSTRACT

A method of measuring a volume in a fluid flow micromechanical device includes: a) providing and positioning an optical apparatus for measuring the profile of a surface; b) providing a device for acquiring and processing the images coming from the optical apparatus for measuring a profile; c) placing the moving member in a first position and then in a second position, and activating the optical apparatus for measuring the profile of the surface to direct a light beam on the reference face, and activating the image acquisition and processor device to obtain a first image in the first position of the moving member and a second image in the second position; and d) comparing the second image with the first image of the reference face to determine the variation in the volume of the cavity generated by the deformation of the moving member.

12 Claims, 5 Drawing Sheets

U.S. PATENT DOCUMENTS 5,257,090 A * 10/1993 Meinzer et al. ............. 356/498
7,005,078 B2 2/2006 Van Lintel et al.
7,311,503 B2 12/2007 Van Lintel et al.
2004/0246572 A1 12/2004 Mueller

FOREIGN PATENT DOCUMENTS

WO 02067037 8/2002

OTHER PUBLICATIONS

Husband et al., Novel Actuation of an Integrated Peristaltic Micropump, Microelectronic Engineering, 73-74, pp. 858-863 (2004).

Guirardel et al., PZT Polarization Voltage Effects on Off-centered PZT Patch Actuating Silicon Membrane, Science Direct, Sensors and Actuators, A 110 pp. 385-389, (2004).

Roche et al., Non-linear Dynamics of Flexural Disc Transducers, IEEE Ultrasonics Symposium, pp. 971-974, (1997).

Yasuno et al., Wavefront-Flatness Evaluation by Wavefront-Correlation-Information-Entropy Method and its Application for Adaptive Confocal Microscope, Science Direct, Optics Communications 232, pp. 91-97, (2004).

* cited by examiner

METHOD FOR MEASURING VOLUME BY AN OPTICAL SURFACE PROFILOMETER IN A MICROMECHANICAL DEVICE AND A SYSTEM FOR CARRYING OUT SAID MEASUREMENT

The invention relates to a method of measuring volume in a micromechanical device by optically measuring the profile of a surface therein, said micromechanical device comprising a stack covered by a transparent closure plate, said stack comprising a support plate and a silicon wafer covering said support plate and itself covered by the closure plate, at least one cavity being formed between said closure plate and said silicon wafer, a moving member formed in the silicon wafer being suitable for moving towards and away from the support plate respectively between first and second positions that define a variation in the volume of said cavity.

The term "transparent" is used herein to mean that the closure plate passes radiation belonging to the spectral range that extends at least from the ultraviolet to the infrared, included.

The moving member formed in the silicon wafer can be caused to move towards and away from the support plate under the pressure of a fluid in said cavity, in particular under the pressure of a liquid for the moving member of a liquid inlet or liquid outlet control member generally constituting a valve, or by mechanical drive from an actuator, e.g. of piezo-electric or other type, or by a combination of different types of drive.

The present invention also relates to providing an assembly for use in measuring the variation of volume generated by deforming a moving member such as a membrane in a micro-mechanical device, in particular a device of the fluid flow type, and in particular a moving member forming the liquid pumping member of a micropump, e.g. operating as a micro-pump for medical use to deliver regularly a controlled quantity of liquid medication.

It is necessary to be able to characterize the volume of the cavity formed in a micromechanical device, in particular a fluid flow device, in a manner that does not disturb the structure of the device, and in particular without making contact therewith.

Specifically, measuring the variation in the volume of such cavities is necessary in order to be able to characterize the pumping ability specific to each fluid flow device after it has been fabricated, i.e. the volume, in particular the liquid volume, that is pumped on each go-and-return "pump stroke" of the moving member when the moving member in question is the pump membrane of a micropump.

This measurement may serve merely to verify that machining tolerances were satisfactory during production. Otherwise, the measurement can be used for calibrating the pump volume of the micropump. The value of the measurement is then given in an identity sheet belonging to each fluid flow device (e.g. in the form of an analog code—by adjusting the resistance of a resistor—or digitally—by using an EEPROM memory, a bar code, or a fusible circuit, which may be hard-wired, or laser-encoded).

When the micropump is being controlled by an electronic control system, this makes it possible to read the value so that the system can calculate the number of "pump strokes" to be implemented per unit time in order to achieve the desired flow rate, and thus deliver a quantity of liquid with very great accuracy.

Usually, for a micropump of the kind described for example in document WO 01/90577, the measurement is obtained by determining the quantity of liquid that is pumped (or pump volume) on each "pump stroke" or go-and-return movement of the pump membrane.

The go-and-return movement of each "pump stroke" corresponds to the movement of the pump membrane from a first position (said to be a "low" position that is spaced apart from the closure plate) towards a second position (said to be a "high" position close to the closure plate), while the return movement of each "pump stroke" corresponds to the membrane moving from said second (or "high") position towards said first (or "low") position.

Depending on the structure of the micropump, several situations can arise concerning the position of the pump membrane when it is at rest.

Amongst these various situations, mention can be made in non-exhaustive manner of the following:

the situation in which the membrane is moved from its initial, rest position, by being deformed in response to a piezoelectric actuator (or any other type of control, in particular electrostatic control), and then returns to its rest position. In this situation, the rest position corresponds to one of the two extreme positions selected from the "low", first position and the "high", second position, while the other position amongst the first and second positions is a deformed position. Amongst those two possibilities, document WO 01/90577 describes a micropump in which the rest position of the pump membrane corresponds with the "low", first position; and the situation in which the membrane in its initial, rest position, constituting an intermediate position, is subjected to a first deformation in response to a first type of drive from the actuator, so as to take up its "low", first position, and then to a second deformation in response to a second type of drive from the actuator, so as to take up its "high", second position, and then said membrane is again driven by the actuator to return to its low position. Actuation is then of the "push-pull" type, i.e. it is initially necessary to attract the membrane downwards in order to suck in liquid and then push the membrane in order to expel the liquid, The membrane is thus deformed both in its high position and in its low position. When the membrane is not being driven, it returns to its intermediate rest position.

Thus, the procedure for measuring the pump volume is relatively lengthy (several minutes) since it is necessary to fill the entire fluid flow circuit of the micropump with liquid, and then to measure the volume of liquid entering or leaving the micropump over one or more pump strokes, and finally to dry out the fluid flow circuit. Furthermore, it is necessary to inspect the membrane visually after performing such a measurement in order to verify that there are no anomalies, and in particular that the membrane has not remained jammed in a deformed position.

It will be understood that taking such a measurement requires numerous manipulation and treatment operations that are too lengthy for mass characterization as is needed during industrial type production.

Because of the flow of the liquid, there is a risk of contamination by solid residues such as dust or particles. Thus, in order to ensure that there are no bacteria, it is necessary to perform decontamination: after the assembly has been dried it can be sterilized using gamma rays, but without prior drying, sterilization is made more difficult.

An object of the present invention is thus to overcome the drawbacks of prior art techniques for characterizing the variation in the volume of a fluid flow device, in particular those methods that make use of liquid flow.

For this purpose, the present invention proposes providing a method of measuring volume without making contact with the internal contact of the fluid flow device.

This object is achieved by the method of the invention for measuring variation of volume by optically measuring the profile of a surface, wherein the following steps are performed:

a) providing and positioning an optical apparatus for measuring the profile of a surface in such a manner that the face of the moving member facing towards the closure plate is the reference face for the measurement;

b) providing image acquisition and processor means enabling images coming from the optical profile measuring apparatus to be acquired and processed;

c) placing said moving member in said first position and activating said optical apparatus for measuring the profile of the surface to direct a light beam on said reference face; and activating the image acquisition and processor means to obtain a first image of said reference face in said first position of the moving member;

d) placing said moving member in said second position and activating said optical apparatus for measuring the profile of the surface to direct a light beam on said reference face; and activating the image acquisition and processor means to obtain a second image of said reference face in said second position of the moving member; and e) comparing said second image with said first image of said reference face to determine the variation in the volume of the cavity caused by the deformation of the moving member.

It should be observed that in step d), the moving member is placed in its second position by deformation that is generated mechanically, in particular with an actuator, and thus advantageously without fluid and in particular without liquid passing through the cavity.

It can thus be understood that the invention makes it very simple to measure the variation in the volume of the cavity without making contact and without passing fluid, in particular liquid, through the cavity.

The measurement is thus carried out by comparing images of the face of the moving member that faces the cavity, which images are obtained in a first position (in particular a rest position) and in a second position (in particular after deflection), using optical techniques for measuring a profile.

In a first implementation of the method of optically measuring volume by measuring the profile of a surface, said optical apparatus for measuring the profile of a surface is an interferometer operating either with white light by detecting the coherence maximum of two polychromatic wavefronts, or with monochromatic light by using phase shifting interferometry (PSI), or by operating as a digital holographic microscope so that said first and second images are interference images.

Preferably, in this first implementation of the method of optically measuring volume by measuring the profile of a surface, the optical apparatus for measuring the profile of a surface includes a reference mirror, and during step a), a compensating plate that is optically equivalent to said transparent closure plate is placed on said reference mirror.

In a second implementation of the method of optically measuring volume by measuring the profile of a surface, said optical apparatus for measuring the profile of a surface is an instrument operating on the principle of confocal microscopy.

In a preferred implementation of the method in accordance with the invention, for optically measuring volume by measuring the profile of a surface, said micromechanical device is a micropump, said cavity is a pump chamber, said moving member is a membrane, and the variation in the volume of the pump chamber is measured, between the first position of the membrane referred to as the low position, that is reached when said membrane terminates its movement away from the closure plate (e.g. when said membrane is in mechanical abutment), and the second position of the membrane corresponding to a high position reached when said membrane terminates its movement towards the closure plate (e.g. when said membrane is in mechanical abutment).

The term "the membrane is in mechanical abutment" should be understood as covering all situations in which mechanical abutment exists, i.e. movement of the membrane is stopped by contact, regardless of whether the membrane itself makes contact, or contact is made by some other part secured thereto.

The present invention also provides an assembly for optically measuring variation of volume by measuring the profile of a surface in a fluid flow micromechanical device, the assembly overcoming the drawbacks of the prior art.

To this end, said measurement assembly of the present invention comprises:

a micromechanical device comprising a stack covered by a transparent closure plate, said stack comprising a support plate and a silicon wafer covering said support plate and itself covered by said closure plate, at least one cavity being formed between said closure plate and said silicon wafer, a moving member formed in the silicon wafer being suitable for moving towards and away from the support plate between first and second positions, referred to as low and high positions respectively, that define a variation in the volume of said cavity;

apparatus for optically measuring the profile of a surface, the apparatus being mounted in such a manner that the face of the moving member facing towards the closure plate is the reference face for measurement when a light beam is directed onto the fluid flow micromechanical device; and image acquisition and processor means enabling images coming from the optical profile measuring apparatus to be acquired and processed and enabling the variation in the volume of the cavity generated by deformation of the moving member to be determined by comparing a first image of said reference face in said first position of the moving member with a second image of said reference face in said second position of the moving member.

Consequently, with this assembly for optical profile measurement, it is possible to implement the method of the invention and measure very simply variation in the volume of the contact without making contact and without passing a fluid, in particular a liquid, through the cavity.

In a first embodiment of the assembly of the present invention for optically measuring a profile, said optical apparatus for measuring the profile of a surface is an interferometer operating either with white light by detecting the coherence maximum of two polychromatic wavefronts, or with monochromatic light by using phase shifting interferometry (PSI), or by operating as a digital holographic microscope so that said first and second images are interference images.

Preferably, in this first embodiment of the assembly for optically measuring a profile, said optical apparatus for measuring the profile of a surface includes a reference mirror and a compensating plate that is optically equivalent to said transparent closure plate is placed on said reference mirror.

In a second embodiment of the assembly for optically measuring a profile, said optical apparatus for measuring the profile of a surface is an instrument operating on the principle of confocal microscopy.

In a preferred arrangement of the assembly for optically measuring a profile, said micromechanical device is a micropump, said cavity is a pump chamber, said moving member is a membrane, and variation in the volume of the pump chamber is measured between the first position of the membrane, e.g. corresponding to a rest position, and the second position of the membrane, e.g. corresponding to a deformed position.

Other advantages and characteristics of the invention appear on reading the following description made by way of example and with reference to the accompanying drawings, in which.

Figures 1, 2:
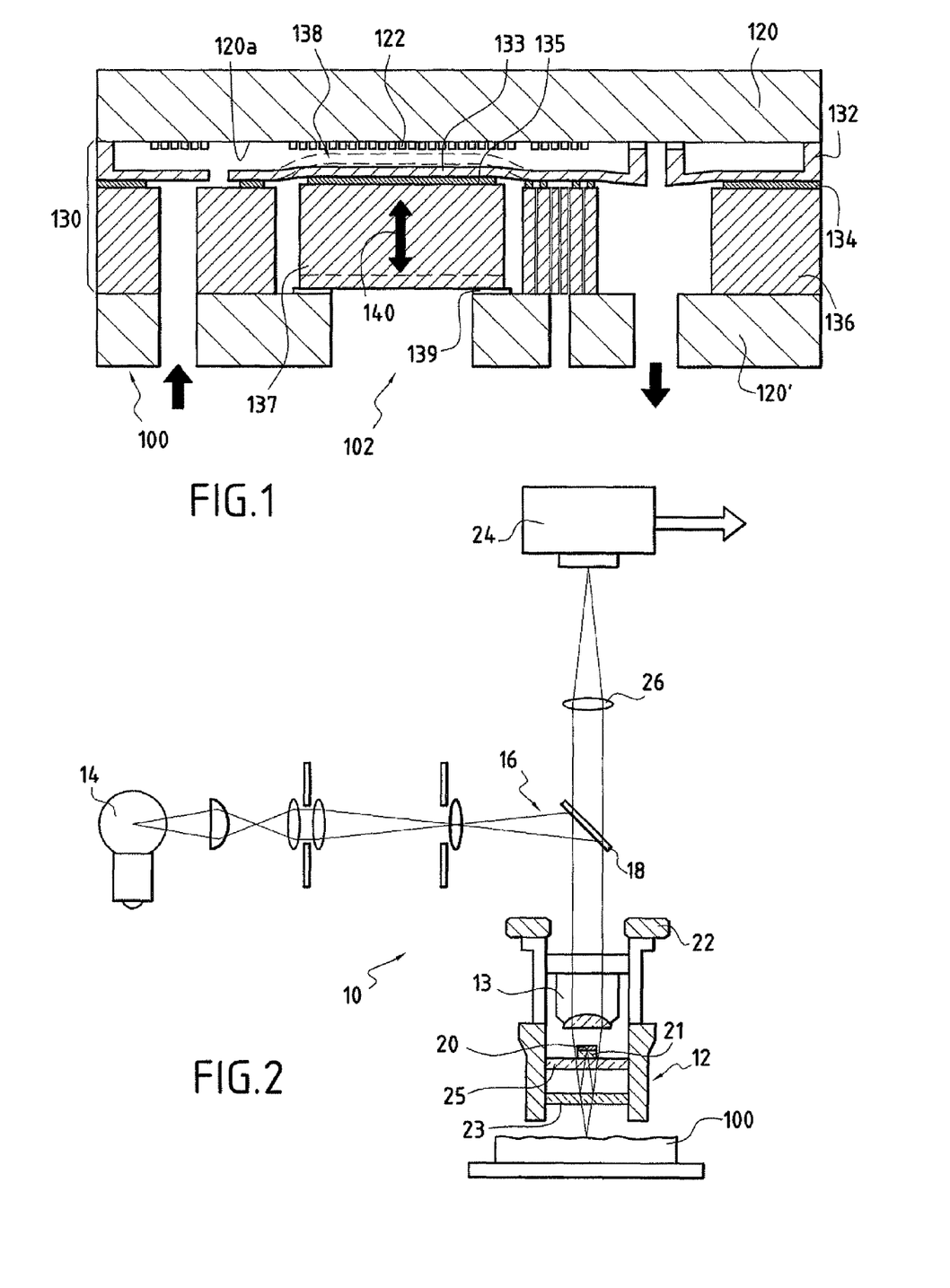
FIG. 1 is a diagrammatic longitudinal section view of a micropump.
FIG. 2 is a diagram showing a first setup suitable for performing the measurement method in accordance with the first implementation of the present invention in first and second variants.

FIG. 1 shows a micropump 100 forming a fluid flow assembly constituted essentially by a glass closure plate 120 and a stack 130, the glass closure plate 120 overlying the stack 130.

In FIG. 1, the stack 130 comprises three elements extending over the entire surface are of the micropump 100 and superposed from top to bottom, namely: a silicon wafer 132; a layer 134 of silicon oxide; and a silicon support plate 136.

This type of stack is commonly referred to as silicon-on-insulator (SOI) and is commercially available in the form of wafers of the kind used in the semiconductor electronics industry.

The micropump 100 incorporates (from left to right in FIG. 1) a liquid inlet control member, a pump portion 102, a pressure detector member, and a liquid outlet control member.

Preferably, in addition to the glass closure plate 120 and the stack 130, the micropump is also provided with an additional glass closure plate 120' bonded by plate welding to the face of the support plate 136 that is remote from the glass closure plate 120, i.e. in the bottom portion of FIG. 1.

A cavity is defined between the glass closure plate 120 and the silicon wafer 132. To define the cavity, the silicon wafer 132 has been machined in its face that faces towards the glass closure plate 120.

This machining has defined a pump membrane 133 in the silicon wafer 132.

It should be observed that the glass closure plate 120 serves not only to close in sealed manner the cavity of the micropump 100 that is to be filled with liquid, but also as an abutment against upward movement of the pump membrane 133.

In order to prevent adhesion or a suction cup effect between the pump membrane 133 and the closure plate 120, spot elements 122 made of an anti-adhesive material are distributed over the face 120a of the closure plate 120 facing towards the stack 130.

The closure plate 120' also acts as an abutment in the downward movement of the pump membrane 133 by contact between the plate 120' and a pump moving portion 137 formed in the support plate 136 and separated therefrom, the moving portion 137 of the pump being secured to the pump membrane 133 via a fraction 135 of the silicon oxide layer 134.

The combination of these two abutments (plates 120 and 120') serves to control the maximum amplitude of the vertical movement of the pump membrane 133 and enables the maximum volume of liquid pumped on each go-and-return movement of the pump membrane 133 to be determined accurately.

Between the liquid inlet control member and the pressure detector, the micropump 100 comprises the pumping portion 102 provided with a pump chamber 138 situated in the cavity defined between the glass closure plate 120 and the silicon wafer 132.

The pump membrane 133 is in the form of a disk and it is situated in the silicon wafer 132, facing firstly the pump chamber 138 and secondly an empty annular volume machined in the support plate 136 and serving to separate the moving portion 137 of the pump from the remainder of the cylinder support plate 136, which portion is in the form of a solid cylinder of circular section. The moving portion 137 of the pump is connected to the pump membrane 133 by the fraction 135 of the silicon oxide layer 134, which fraction is left intact.

Means for controlling the micropump 100, referred to generically as an actuator, may be internal or external relative to the micropump: for example they may be situated in register with the pump membrane 133.

These control means may operate in particular on piezoelectric, electromagnetic, or pneumatic principles.

The micropump 100 can be used in numerous applications, in particular as a pump for medical use for continuously delivering liquid medication.

Because of its very small dimensions, such a pump may be of the "implantable" type, i.e. it may be capable of being placed under the skin of a patient, or else it may be of the "external" type, and connected via its inlet control member to the patient's blood circulation system via an inlet port through the skin.

In FIG. 1, the micropump 100 is shown in its low or rest position, forming a first position of the pump membrane 133 in which the pump membrane 133 is in fact already slightly deflected relative to the remainder of the silicon wafer 132: the moving portion 137 of the pump is slightly raised relative to the remainder of the support plate 136, an anti-adhesion layer 139 of annular shape being interposed between the moving portion 137 and the additional closure plate 120'.

This first or low position is reached herein because the bottom face of the moving portion 137 of the pump comes into contact against the anti-adhesion layer 139, which thus forms a mechanical abutment for the first position of the pump membrane 133. Alternatively, if the anti-adhesion layer 139 is placed on the bottom face of the moving portion 137 of the pump, then in the first position of the pump membrane 133, it is the bottom face of the anti-adhesion layer 139 that can comes mechanically into abutment against the top face of the additional glass closure plate 120'.

The high or second position of the pump membrane 133 and of the moving portion 137 of the pump is represented in FIG. 1 by dashed lines.

In this second position, the pump membrane 133 is deformed so as to move towards the face 120a of the closure plate 120 together with its anti-adhesion elements 122. This second or high position has the top face of the pump membrane 133 coming into contact against the anti-adhesion spot elements 122, which thus form a mechanical abutment for the second position of the pump membrane 133.

Since the pump membrane 133 remains part of the silicon wafer 132 in which it is formed, the circular periphery of the pump membrane 133 remains in the general plane of the silicon wafer 132 such that, in this second position, the membrane 133 forms a somewhat curved profile at its periphery, as can be seen from the dashed lines in FIG. 1.

By means of the above-mentioned actuator (not shown), the pump membrane 133 is caused to perform a series of downward and upward reciprocating movements (arrow 140) between its two extreme positions forming the first and second positions, thereby causing the volume of the pump chamber 138 to vary, and thus enabling the pumping function to be performed.

In its second position, the pump membrane 133 is deformed "under tension".

In the present invention, it is desired to measure the variation in the volume of the pump chamber 138, but without making contact, and without a liquid passing through the cavity including the pump chamber 138.

This measurement is performed by viewing the position of the pump membrane 133 in its first position and in its second position, and then calculating the variation in the volume of the pump chamber 138 that corresponds to the difference between those two positions.

The principle relies on optically measuring the topographical shape of the surface of the top face of the pump membrane 133 before and after actuating the pump (i.e. in the low position and in the high position), with the difference between the two images giving directly the volume of liquid pumped.

In a first implementation, this optical measurement or detection of the topographical shape makes use of interferometric methods.

It is recalled that an interferometer is an optical device that splits a light ray into two separate rays and then recombines them. The resulting interference phenomenon is recorded in the form of an interferogram made up of dark and light fringes that are directly correlated with the topographical shape of the object.

In a first variant of the first implementation, the white light interferometry technique is used, based on detecting the coherence maximum between two polychromatic wave fronts.

FIG. 2 shows a measurement assembly 10 comprising a simplified interferometer with a Mirau type lens adapted to medium magnification.

From a white light source 14, a collimated beam of white light 16 is formed that passes through a beam splitter 18 that splits the beam into two portions: a first beam portion illuminates the sample formed by the micropump 100, while the second beam portion is directed towards a reference mirror 20.

A Mirau 12 type interferometric measurement head is placed on the light path formed between the beam splitter 18 and the sample (micropump 100).

This Mirau 12 type interferometric measurement head includes a lens 13. Between the lens 13 and the micropump 100, the Mirau 12 type interferometric measurement head further includes (going downwards in FIG. 2): the reference mirror 20, a compensation plate 21, and another beam splitter 23.

The lens 13 can be moved in vertical translation by a support 22 that is movable in translation.

The two beams as reflected respectively by the reference mirror 20 and by the sample (micropump 100) are then recombined and transmitted through the beam splitter 18 towards a charge-coupled device (CCD) camera 24. The interference phenomenon produces a series of dark and bright fringes. This interference pattern, referred to as a interferogram, is projected on the CCD camera 24 and recorded. Upstream from the CCD camera 24 there is placed a magnification selector 26.

At each measurement point, fringe intensity is at a maximum in the coherence plane where the path-length difference traveled by the two beam portions is zero.

By imparting movement in translation (using the support 22) to the lens 13 of the interferometric measurement head 12, or to the sample (micropump 100) about the focus point, while recording interferograms at known intervals (vertical scanning interferometry (VSI)), it is possible to reconstruct the relief of the surface of the sample from the way in which the intensity of the signal is modulated as a function of vertical position.

In particular, in this example, the relief of the top face of the pump membrane 133 is reconstructed.

This technique makes it possible in particular to detect surfaces presenting discontinuities.

The method consists in obtaining a representation, in particular a topographic representation, of the pump membrane 133 in its low position and in its high position, with the difference between the two images making to possible to calculate the variation in the volume of the pump chamber, i.e. the nominal pump volume of the pump.

The face of the pump membrane 133 facing towards the pump chamber 138 (the top face in FIG. 1) thus serves as a reflecting surface.

The cover-forming closure plate 120, which can act in particular as a stroke limiter for the pump membrane 133, must be transparent in the visible range for this technique to be used. It is thus possible to use a closure plate 120 made of glass, but not a closure plate made of silicon.

This closure plate also gives rise to additional optical interfaces. It is therefrom necessary to place an equivalent plate on the reference mirror 20 in order to balance the two arms of the interferometer. A compensation plate 21 of glass having the same thickness and the same refractive index as the closure plate 120 is therefore used.

There is no ambiguity concerning the observed face during detection between the (front) face of the membrane 133 facing towards the pump chamber 138 and the (rear) face of the closure plate 120 facing towards the pump chamber 138, since the interferometer cannot focus simultaneously on the membrane in the low position and observe interference fringes on said rear face, This is due to the very short coherence length of white light (less than one micrometer).

It is this principle that makes it possible to identify discontinuities such as those encountered around the membrane 133. Thus, the presence of particles is revealed in particular by discontinuities on the surface of the membrane 133.

Consideration is now given to the second variant of the first implementation: it consists in combining the method of the first variant as described above with the method known as phase-shifting interferometry (PSI), for the purpose of improving resolution.

In this second variant, it is possible to use the same setup as that described with reference to FIG. 2, with only the light source changing, since it must now be a monochromatic source. Instead of replacing the white light source 14 of FIG. 1 with a source of monochromatic light, a variant consists in conserving the source and in adding a filter that is preferably disposed before the beam splitter 18.

In addition, it is no longer necessary to move the sample (micropump 100) or the measurement head (lens 13) unless the depth of field of the lens used is not sufficient for observing the entire depth of the cavity (pump chamber 138).

Figure 3:
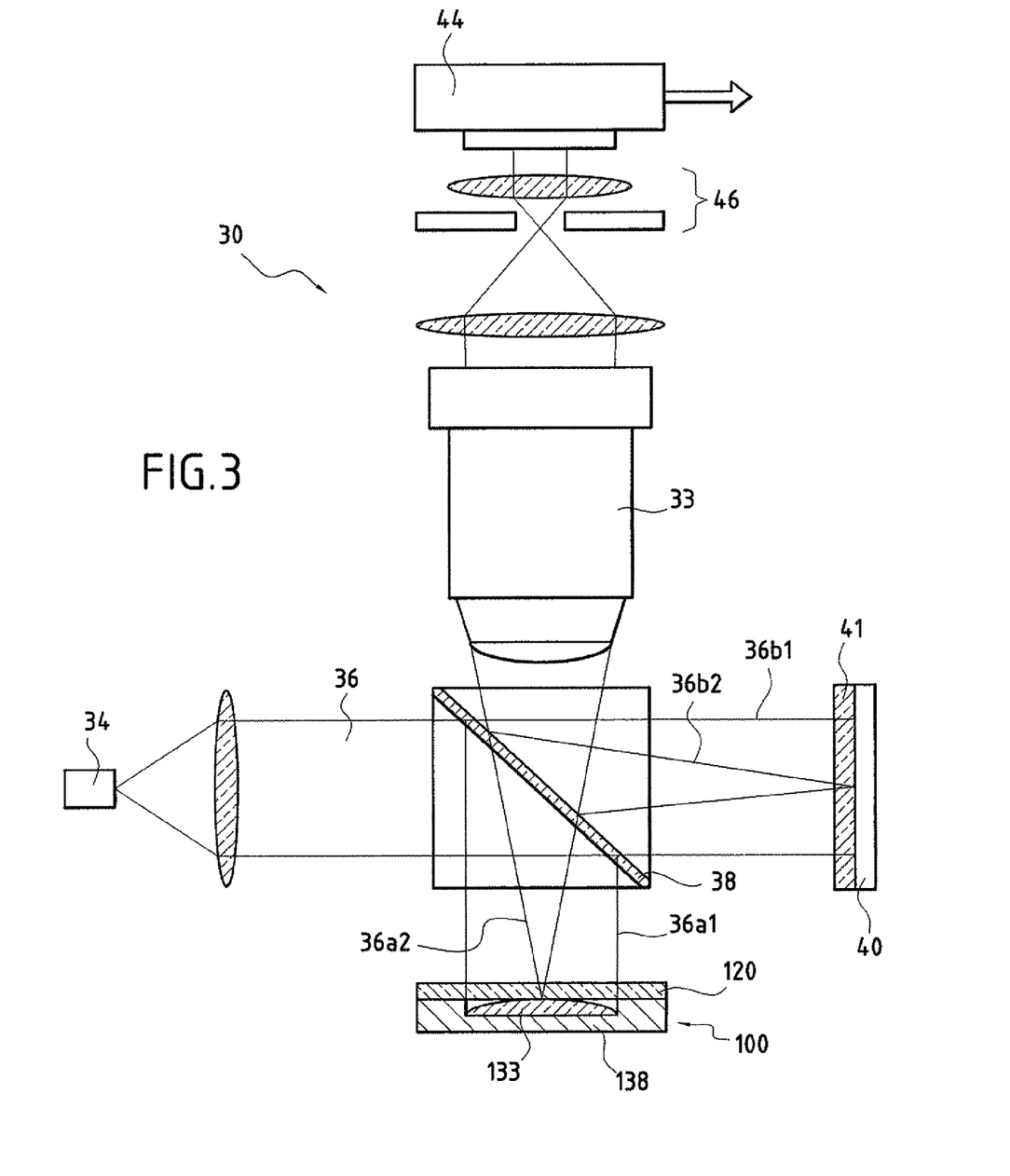
FIG. 3 is a diagram of a second setup suitable for performing the measurement method in accordance with the first implementation of the present invention in the first and second variants, and also in the third variant.

FIG. 3 is a simplified view of a setup of the Michelson type that is well adapted to low magnification and that can be used in the second variant of the first implementation.

In this measurement assembly 30, a laser source 34 sends a collimated beam 36 to a beam splitter 38 which splits the beam 36 into an incident first beam portion 36a1 directed to the sample-forming micropump 100, and an incident second beam portion 36b1 directed to the reference mirror 40 covered by the glass compensation plate 41.

The reflected beams (first reflected beam portion 36a2 and second reflected beam portion 36b2) are then recombined by the beam splitter 38 and pass through a lens 43 and then through an optical assembly 46 made up of a series of lenses together with a diaphragm, situated ahead of a CCD camera 44.

The interference phenomenon produces a series of dark and bright fringes forming an interferogram that is projected on the CCD camera 44 and recorded.

Another lens (not shown) may be added above the sample (micropump 100) in order to improve transverse resolution.

In this variant, interference fringes appear on each variation in height that is equal to half the wavelength of the light source used. It is therefore necessary to perform phase unwrapping in order to obtain a map of height.

Determining the variation in the volume of the pump chamber 138 then consists likewise in subtracting the images obtained between the high and low positions of the membrane 133.

Combining the VSI and PSI techniques makes use of the advantages of both methods.

It should be observed that the Michelson type interferometer shown in FIG. 3 can also be used for the first variant of the first implementation by replacing the laser source with a source of white light.

Figure 4:
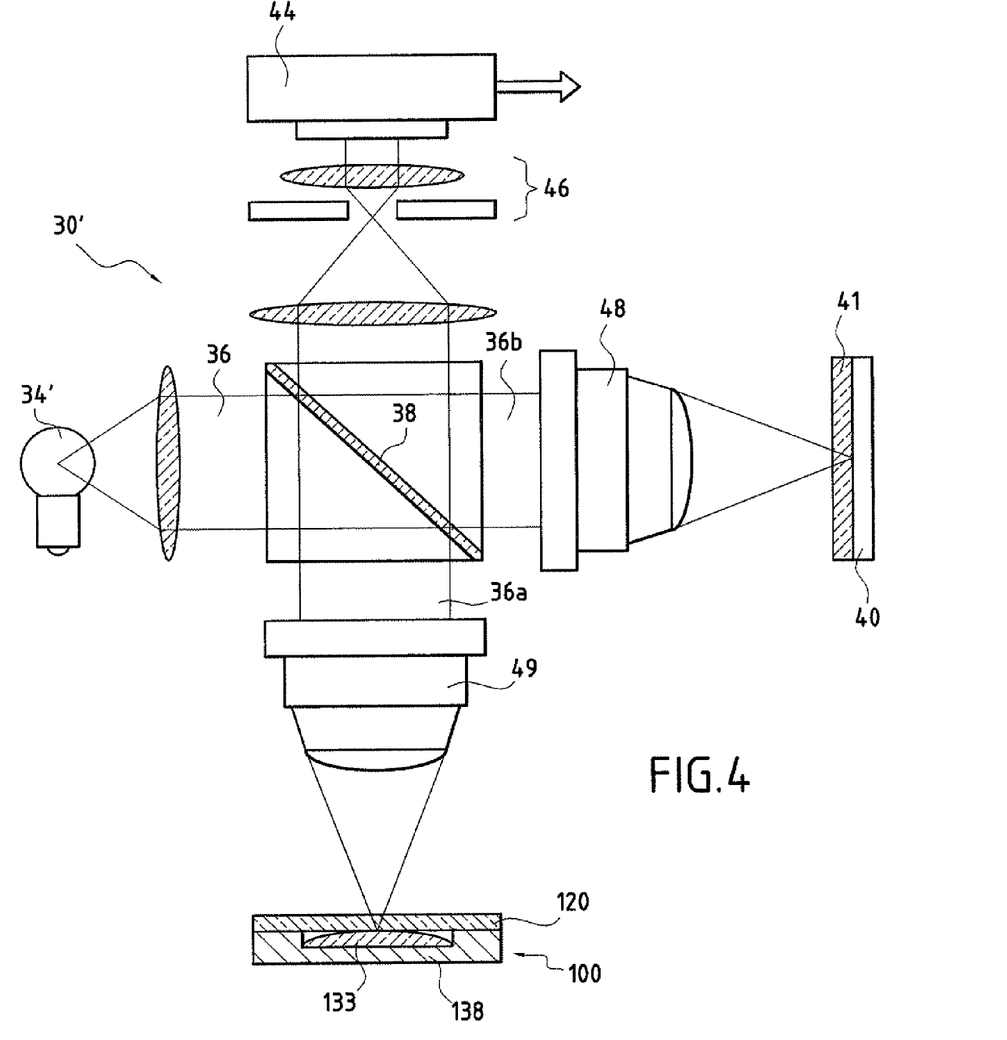
FIG. 4 is a diagram of a third setup likewise suitable for performing the measurement method in accordance with any one of the three variants of the first implementation of the present invention.

An interferometer of the Linnik type may also be used for large magnifications. The corresponding setup 30' is shown in FIG. 4 and it is described in terms of its differences relative to the Michelson type setup of FIG. 3. Consequently, the same reference symbols as those used in FIG. 3 are used again in FIG. 4 in order to designate the same elements.

In this setup, the beam of white light 36 coming from the source 34 is split by a beam splitter 38 into two beam portions 36a and 36b that are directed respectively towards a reference mirror 40 and the sample (micropump 100) via two separate lenses (respectively a first lens 48 and a second lens 49).

The reflected beams are then recombined and analyzed by a CCD camera 44 after passing through the beam splitter 38.

The compensation plate 41 is naturally placed on the reference mirror 40. This Linnik type interferometer shown in FIG. 4 can be used with the first variant, the second variant, and a third variant of the first implementation of the method in accordance with the present invention.

In the third variant of the first implementation, use is made of the digital holographic microscopy technique.

This third variant can make use of the setup of FIG. 3 or that of FIG. 4.

Under such circumstances, the reference mirror 40 may optionally be inclined, depending on the reconstruction mode selected for the digital hologram.

Figure 5:
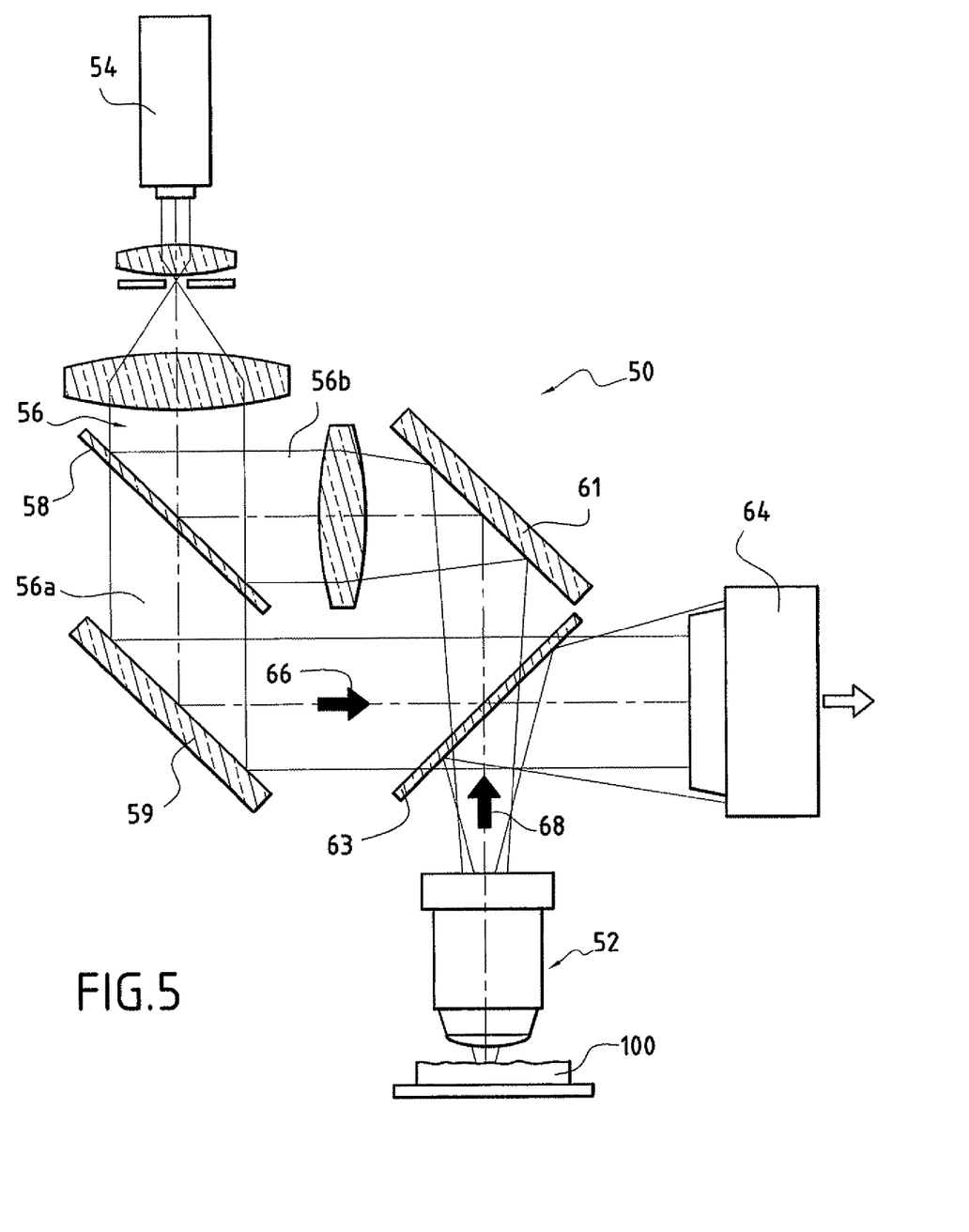
FIG. 5 is a diagram of a fourth setup suitable for performing the measurement method in accordance with the third variant of the first implementation of the present invention.

Another possible type of setup for this third variant and that makes use of two beam splatters and two mirrors is shown in FIG. 5: this is a setup that operates in reflection mode.

In the measurement assembly 50 of FIG. 5, a laser source 54 sends a collimated beam 56 to a first beam splitter 58, which splits the beam 56 into a first beam portion 56a directed to a first mirror 59, and a second beam portion 56b directed to a second mirror 61, via a lens.

The beam reflected by the first mirror 59 serves as a reference beam 66.

The beams coming from the two mirrors 59 and 61 are directed to a second beam splitter 63 situated behind a lens 52.

At the outlet from this second beam splitter 63, the beam from the mirror 61 is directed to the sample-forming micropump 100 via the lens 52. This beam is reflected on the membrane and then the reflected beam 68 is recombined with the reference beam 66 coming from the first mirror 59, after passing through the beam splitter 63, and thereafter this recombined beam reaches the CCD camera 64 which records the interferogram.

In this digital holography or holographic interferometry technique, use is made of the principle that consists in recording the complex amplitude distribution of the light, i.e. its amplitude and phase.

The interference pattern between the reference beam 66 and the object beam reflected by the sample (membrane 133 of the micropump 100) via the system of beam splitters 58 and 63 and mirrors 59 and 61 is recorded digitally by the CCD camera 64.

It is this intensity distribution that is called a hologram. The hologram is reconstructed digitally, and the relief is found by the so-called phase imaging method. It is mainly the technique used for analyzing the interferograms that differs relative to PSI. If the object does not give rise to non-uniform phase shifts on reflection, the phase image is associated with the wave travel time, i.e. with the relief of the object. If this relief is not too great, then a 3D map of the surface is obtained.

Determining the variations in the volume of the pump chamber by subtracting the low position and high position images of the pump membrane of the micropump 100 is then similar to that described above.

In a second implementation, a confocal microscopy technique is used for optically detecting or measuring the topographical shape of the surface of the pump membrane.

Confocal microscopy techniques can be used for characterizing microfluid flow cavities.

Figure 6:
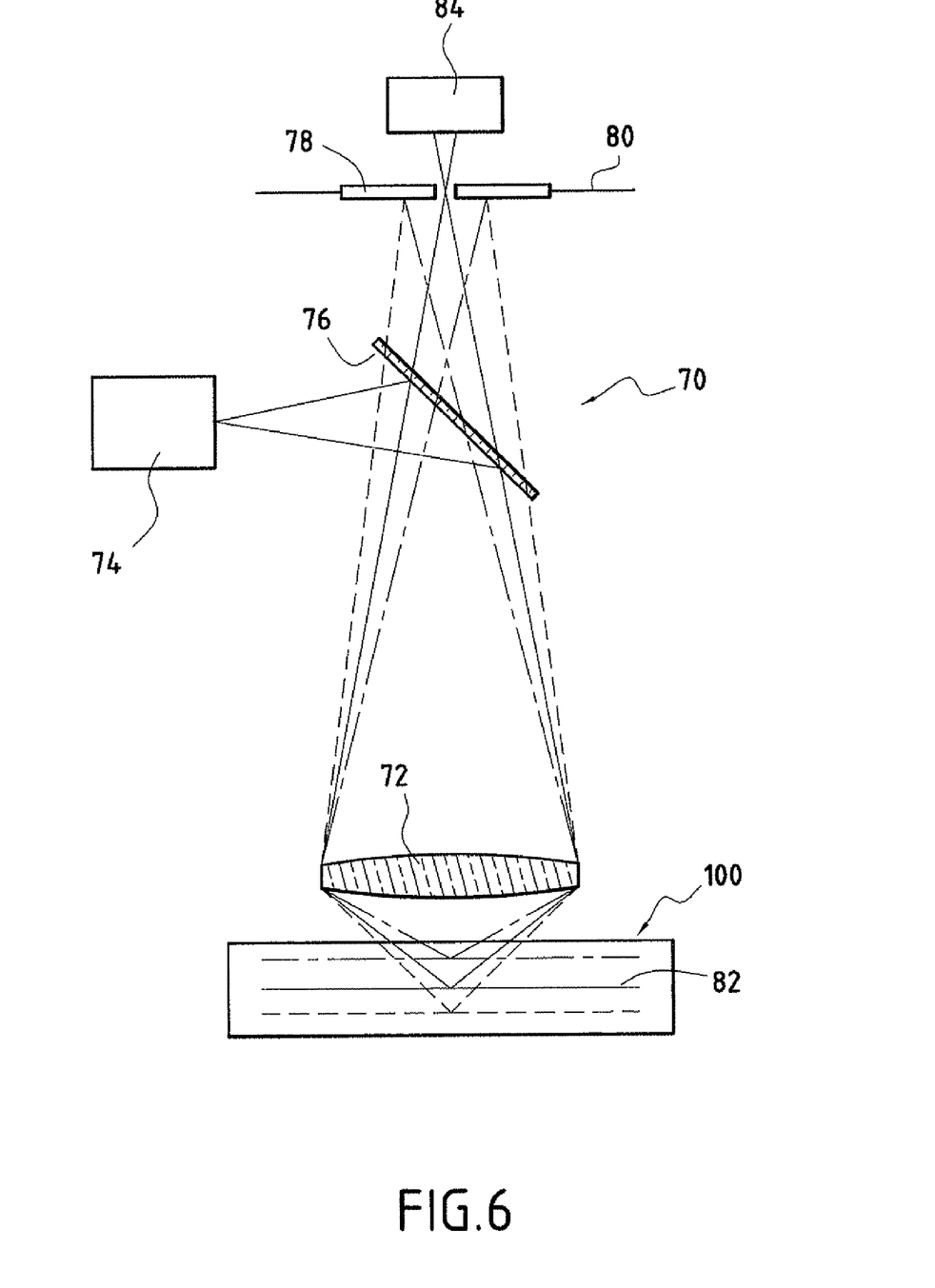
FIG. 6 is a diagram of a fifth setup suitable for performing the measurement method in accordance with the second implementation of the present invention.

The corresponding measurement assembly 70 is shown in FIG. 6.

A lens 72 is placed over the sample (micropump 100).

A laser light source 74 sends its light beam to a beam splitter 76 that directs the incident light beam to the micropump 100, and in particular to the face of the pump membrane 133 that faces towards the pump chamber 138.

The beam reflected by the membrane 133 reaches a series of photodetectors or a CCD camera 84.

Upstream from the CCD camera 84, there is placed a confocal diaphragm filter or "pinhole" 78 such that only the image of the focal plane 82 reaches the CCD camera 84.

It is necessary to perform scanning in an (X,Y) plane parallel to the micropump 100 of the opening in the confocal diaphragm 78 (pinhole) in order to record a complete image of the cavity through the transparent closure plate 120.

This confocal diaphragm 78 serves to eliminate any signal coming from planes other than the focus plane (dashed and chain-dotted lines in FIG. 5).

The sample (micropump 100) or the complete measurement head is then moved in order to measure another horizontal section of the sample. A series of optical sections thus acquired makes it possible to obtain a 3D reconstruction of the pump membrane in the low position.

This procedure is repeated with the pump membrane in the high position, and the difference between the two profiles gives the variation in the volume of the cavity.

It should be observed that these techniques implemented in accordance with the present invention make it possible simultaneously to detect and locate defects of the pump membrane 133 having a diameter equivalent to the wavelength of the light beam used, i.e. typically of micrometer order.

The invention claimed is:

1. A method of measuring a volume in a fluid flow micromechanical device by optically measuring the profile of a surface therein, said micromechanical device comprising a stack covered by a transparent closure plate, said stack comprising a support plate and a silicon wafer covering said support plate and itself covered by the closure plate, at least one cavity being formed between said closure plate and said silicon wafer, a moving member formed in the silicon wafer being suitable for moving towards and away from the support plate respectively between first and second positions that define a variation in the volume of said cavity, the method comprising:
   a) providing and positioning an optical profile measuring apparatus for measuring a profile of a surface in such a manner that a face of the moving member facing towards the closure plate is a reference face for the measurement;
   b) providing image acquisition and processor means enabling images coming from the optical profile measuring apparatus to be acquired and processed;
   c) placing said moving member in said first position and activating said optical profile measuring apparatus for measuring the profile of the surface to direct a light beam on said reference face; and activating the image acquisition and processor means to obtain a first image of said reference face in said first position of the moving member;
   d) placing said moving member in said second position and activating said optical profile measuring apparatus for measuring the profile of the surface to direct a light beam on said reference face; and activating the image acquisition and processor means to obtain a second image of said reference face in said second position of the moving member; and
   e) comparing said second image with said first image of said reference face to determine the variation in the volume of the cavity caused by the deformation of the moving member.

2. The method according to claim 1, wherein said optical profile measuring apparatus for measuring the profile of a surface is an interferometer operating either with white light by detecting the coherence maximum of two polychromatic wavefronts, or with monochromatic light by using phase shifting interferometry (PSI), or by operating as a digital holographic microscope so that said first and second images are interference images.

3. A The method according to claim 2, wherein the optical profile measuring apparatus for measuring the profile of a surface includes a reference mirror and in that, during step a), a compensating plate that is optically equivalent to said transparent closure plate is placed on said reference mirror.

4. The method according to claim 1, wherein said optical profile measuring apparatus for measuring the profile of a surface is an instrument operating on the principle of confocal microscopy.

5. The method according to claim 1, wherein said micromechanical device is a micropump, in that said cavity is a pump chamber, in that said moving member is a membrane, and in that the variation in the volume of the pump chamber is measured, between the first position of the membrane referred to as the low position, that is reached when said membrane terminates its movement away from the closure plate, and the second position of the membrane corresponding to a high position reached when said membrane terminates its movement towards the closure plate.

6. The method according to claim 1, wherein at least one of said first position is reached when said moving member is in mechanical abutment with said closure plate and said second position is reached when said moving member is in mechanical abutment with said closure plate.

7. A measurement assembly for measuring volume by optically measuring a profile of a surface in a fluid flow micromechanical device, said measurement assembly comprising:
   a micromechanical device comprising a stack covered by a transparent closure plate, said stack comprising a support plate and a silicon wafer covering said support plate and itself covered by said closure plate, at least one cavity being formed between said closure plate and said silicon wafer, a moving member formed in the silicon wafer being suitable for moving towards and away from the support plate between first and second positions that define a variation in the volume of said cavity;
   an optical profile measuring apparatus for optically measuring the profile of a surface, the optical profile measuring apparatus being mounted in such a manner that the face of the moving member facing towards the closure plate is a reference face for measurement when a light beam is directed onto the fluid flow micromechanical device; and
   image acquisition and processor means enabling images coming from the optical profile measuring apparatus to be acquired and processed and enabling the variation in the volume of the cavity generated by deformation of the moving member to be determined by comparing a first image of said reference face in said first position of the moving member with a second image of said reference face in said second position of the moving member.

8. The measurement assembly according to claim 7, wherein said optical profile measuring apparatus for measuring the profile of a surface is an interferometer operating either with white light by detecting the coherence maximum of two polychromatic wavefronts, or with monochromatic light by using phase shifting interferometry (PSI), or by operating as a digital holographic microscope so that said first and second images are interference images.

9. The measurement assembly according to claim 8, wherein said optical profile measuring apparatus for measuring the profile of a surface includes a reference mirror and in that a compensating plate that is optically equivalent to said transparent closure plate is placed on said reference mirror.

10. The measurement assembly according to claim 7, wherein said optical profile measuring apparatus for measuring the profile of a surface is an instrument operating on the principle of confocal microscopy.

11. The measurement assembly according to claim 7, wherein said micromechanical device is a micropump, in that said cavity is a pump chamber, in that said moving member is a membrane, and in that variation in the volume of the pump chamber is measured between the first position of the membrane and the second position of the membrane.

12. The measurement assembly according to claim 7, wherein at least one of said first position is reached when said moving member is in mechanical abutment with said closure plate and said second position is reached when said moving member is in mechanical abutment with said closure plate.

* * * * *